Patented Dec. 3, 1935

2,022,997

UNITED STATES PATENT OFFICE 2,022,997

ARYL MERCURIC HETEROCYCLIC CARBOXYLATES

Carl N. Andersen, Watertown, Mass., assignor to Lever Brothers Company, a corporation of Maine No Drawing. Application January 9, 1935, Serial No. 967

20 Claims. (Cl. 260—13)

The present invention relates to the production of certain new organic mercury compounds.

It is an object of my invention to produce aryl mercuric heterocyclic carboxylates useful as germicides and for other therapeutic purposes.

I have discovered that when the hydrogen atom of the carboxyl group of heterocyclic carboxylic acids is replaced by the essential radical of certain aromatic mercury compounds, compounds are produced which have extraordinarily high potency as antiseptics and germicides and at the same time are characterized by relatively low toxicity and other desirable properties.

The compounds I have produced may be described as having a general formula $(RHg)_x R_1$, in which R represents an aromatic structure, to a carbon atom of which the mercury is directly attached; in which $x$ represents an integer of one or more; and in which $R_1$ represents a heterocyclic mono- or polybasic carboxylic acid radical that is linked to the RHg group or groups through the replacement of the hydrogen atom of the carboxyl group or groups. While the word "group" is used hereinafter, it is obvious that it is to be understood as plural where the value of $x$ is more than one.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl and naphthyl groups.

The radical $R_1$ represents a radical corresponding to a heterocyclic compound which contains one or more COOH groups attached to one or more of the atoms in the ring. The nature of the ring may be varied. It may have any number of elements and any number of heteroatoms. It may consist of a condensation of aromatic and heterocyclic rings. The heteroatom or atoms may be any of the elements ordinarily found in heterocyclic compounds. The heterocyclic compound may include substituted derivatives of the acids.

The following examples illustrate types of acids falling within the above defined class and from which the aromatic mercury derivatives comprising my invention may be prepared:

Furoic or pyromucic (a-furfurane carboxylic) acid; quinolinic (pyridine 2,3-dicarboxylic) acid; 2-phenyl quinoline 4-carboxylic acid; nicotinic (pyridine 3-carboxylic) acid; 6-methyl 2-phenyl quinoline 4-carboxylic acid; pyrrole alpha-carboxylic acid; quinaldinic (quinoline 2-carboxylic) acid; quininic (6-methoxy quinoline 3-carboxylic) acid; and coumarin carboxylic acid.

I have prepared the organic mercury salts corresponding to all of the above noted heterocyclic acids. These compounds together with others I have investigated comprise a sufficiently representative number of the heterocyclic acids and their derivatives to lead me to believe that all of these acids can be employed to produce my novel mercury compounds. The compounds so prepared have in greater or lesser but always in relatively high degree desirable antiseptic and germicidal properties. I therefore regard my invention as generic to and including the entire group of heterocyclic carboxylic acids and their derivatives.

The general method of producing these compounds consists in reacting together the heterocyclic acid and a compound containing an aromatic mercury radical of the above mentioned type. A common solvent for both reacting components is employed. The compound resulting from the reaction is usually relatively insoluble as compared with the reacting components, and upon its precipitation may be filtered, washed and dried. In my application Serial No. 694,198, filed October 18, 1933, I have disclosed a method of preparing aromatic mercury compounds of this type by reacting an acidic compound with an aromatic mercury hydroxide. This reaction is one of neutralization of an acid and base to form a salt and water. This has the advantage that water is the only other product produced and the resulting compound may be easily purified. In my application Serial No. 694,199, filed October 18, 1933, I have disclosed another method of preparing aromatic mercury compounds of this type by employing a soluble aromatic mercury salt, for example, the lactate or the acetate, in a reaction with the acidic compound. The aromatic mercury compounds produced are of a relatively low solubility as compared with the aromatic mercury salt and are relatively insoluble as compared with the acidic compound. Either of these methods may be employed in producing the compounds comprising this invention. In this reaction the ring structure is not disturbed and the heterocyclic acid radical remains intact except for the replacement of the acidic hydrogen.

The following examples are given as illustrative of a method by which all of the compounds of this group may be prepared and as illustrative of representative organic mercury derivatives falling within the scope of my invention:

Example 1

7.39 grams of furoic acid is dissolved in 100 cc. of water. To this solution is added 17.64 grams of solid phenylmercury hydroxide and the mixture is boiled for 5 minutes. When the reaction is complete, the resulting precipitate is separated by filtration, washed and dried. A solution consisting of 60 parts of water and 40 parts of alcohol is used for recrystallizating the compound. Needle-like, white, glistening crystals are formed which melt at 115° C. The compound is phenylmercury furoate.

Example 2

17.64 grams of phenylmercury hydroxide is dissolved in 4 liters of water, and the mixture is heated until the solution is complete. The solution is filtered to remove any insoluble material. To the filtrate is added 5.51 grams of quinolinic (pyridine 2,3-dicarboxylic acid) acid. A white precipitate results. The mixture is allowed to stand for 12 hours after which the precipitate is separated by filtration, washed well with warm water and then with 50 cc. of alcohol. It is dried at 110° C. It melts at 163–165° C. The compound is phenylmercury quinolinate (phenylmercury pyridine 2,3-dicarboxylate).

Example 3

17.64 grams of phenylmercury hydroxide is dissolved in 4 liters of water and heated until solution is complete. The solution is filtered to remove any insoluble material. To the filtrate is added 16.43 grams of 2-phenyl quinoline 4-carboxylic acid dissolved in one liter of alcohol. A precipitate results and after the mixture is allowed to stand it is filtered. The precipitate is washed well with warm water and dried. It melts at 208–209° C. Upon recrystallization from alcohol it melts at 206–208° C. The compound is phenylmercury 2-phenyl quinoline 4-carboxylate.

Example 4

17.64 grams of phenylmercury hydroxide is dissolved in 4 liters of water and heated until solution is complete. The solution is filtered to remove any insoluble material. To the filtrate is added 8.11 grams of nicotinic acid in aqueous solution. A greenish precipitate results which may be removed by filtration, washed and dried.

20.16 grams of phenylmercury acetate is dissolved in 2 liters of water and heated until solution is complete. The solution is filtered to remove any insoluble material. To the filtrate is added an aqueous solution containing 8.11 grams of nicotinic acid. On standing a precipitate results, which is removed by filtration, washed and dried.

The material obtained by each method appears to be the same and melts at 193–195° C. It is phenylmercury nicotinate.

Example 5

17.64 grams of phenylmercury hydroxide is dissolved in 4 liters of water and heated until solution is complete. The solution is filtered to remove any insoluble material. To the filtrate is added 18.38 grams of neo cinchophen (6-methyl 2-phenyl quinoline 4-carboxylic acid ethyl ester) dissolved in 500 cc. of alcohol. A precipitate results on standing. The mixture is allowed to cool, after which it is filtered and the precipitate washed well with warm water and dried. It melts at 162–163° C. The compound is phenylmercury 6-methyl 2-phenyl quinoline 4-carboxylate.

In this reaction the ester is first hydrolized to yield the carboxylic acid and ethyl alcohol. The acid reacts with the phenylmercury hydroxide to form the salt.

Example 6

20.16 grams of phenylmercury acetate is dissolved in 2 liters of water and heated until solution is complete. The solution is filtered to remove any insoluble material. To the filtrate is added 11.4 grams of coumarin carboxylic acid. A precipitate results and after the mixture is allowed to cool it is filtered and the precipitate washed well with warm water and alcohol and dried. It has a melting point of 205–206° C. The compound is phenyl-mercury coumarin carboxylate.

The reacting materials are employed in substantially theoretical quantities. In some cases, if desired, approximately 10% excess of the acid is employed in order to insure the complete conversion of the phenylmercury compound.

Any suitable solvent in which the reacting components are soluble may be used as the medium for carrying out the reaction. If they are both soluble in water this is generally used for reasons of convenience, but if not, other solvents such as the alcohols or acetone, or mixtures of these with each other, or with water, may be employed. The process may be carried out at any temperature, for example, room temperature. In most cases I find, however, that the use of heat facilitates the solution of the reacting components and speeds the reaction.

From the description of the specific examples, it will be readily apparent to one skilled in the art how other members of the above identified group may be reacted with an aromatic mercury compound to produce the other mercury compounds of analogous structure which are within the scope of my invention.

All of the compounds produced as above described are characterized by extraordinarily high potency as germicides. Tests to determine their efficacy in killing B. typhosus and Staph. aureus were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against Eberthella typhi (typhoid bacillus) at 37° C. and F. D. A. special method against Staph. aureus at 37° C.

As illustrative of the potency of the compounds, the killing power of the following compounds is given merely as illustrative.

The figures represent the maximum dilutions at which killing in 15 minutes resulted:

|  | B. typhosus | Staph. aureus |
|---|---|---|
| Phenylmercury furoate | 1:60,000 | 1:45,000 |
| (In alcohol) | 1:100,000 | 1:45,000 |
| Phenylmercury quinolinate | 1:60,000 | 1:50,000 |
| (In alcohol) | 1:90,000 | 1:45,000 |
| Phenylmercury 6-methyl 2-Phenyl quinoline 4-Carboxylate | 1:100,000 | 1:40,000 |
| Phenylmercury quinaldinate |  | 1:40,000 |
| Phenylmercury coumarin carboxylate | 1:50,000 | 1:40,000 |

In addition to their high germicidal value, all of these compounds are characterized by relatively low toxicity. Because of these properties it is possible to use them in extreme dilutions and in many situations where known germicides, because of toxic or other undesired properties, can not be employed. They may be used externally and locally, and in some cases administered internally with satisfactory results from the germicidal standpoint and without harmful effect to the body or its functions.

The compounds retain their germicidal activity when incorporated in soap and various menstrums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic compound of the general formula $(RHg)_xR_1$, in which R represents an aromatic structure to a carbon atom of which the mercury is directly attached and in which none of the carbon atoms has direct linkage with any element other than hydrogen, carbon and mercury; in which $x$ is an integer having a value of at least one; and in which $R_1$ represents a heterocyclic acid radical that is linked to the RHg group through the replacement of the hydrogen atom of the acidic group.

2. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $x$ is an integer having a value of at least one; and in which $R_1$ represents a nitrogen-containing heterocyclic carboxylic acid radical that is linked to the RHg group through the replacement of the hydrogen atom of the carboxyl group.

3. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $x$ is an integer having a value of at least one; and in which $R_1$ represents a mononuclear heterocyclic carboxylic acid radical that is linked to the RHg group through the replacement of the hydrogen atom of the carboxyl group.

4. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $x$ is an integer having a value of at least one; and in which $R_1$ represents a polynuclear heterocyclic carboxylic acid radical that is linked to the RHg group through the replacement of the hydrogen atom of the carboxyl group.

5. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $x$ is an integer having a value of at least one; and in which $R_1$ represents a mono-nuclear nitrogen-containing heterocyclic carboxylic acid radical that is linked to the RHg group through the replacement of the hydrogen atom of the carboxyl group.

6. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $x$ is an integer having a value of at least one; and in which $R_1$ represents a polynuclear nitrogen-containing heterocyclic carboxylic acid radical that is linked to the RHg group through the replacement of the hydrogen atom of the carboxyl group.

7. A new organic compound of the general formula $(RHg)_2R_1$, in which R represents an aromatic structure to a carbon atom of which the mercury is directly attached, and in which none of the carbon atoms has direct linkage with any other element other than hydrogen, carbon and mercury; and in which $R_1$ represents a mononuclear heterocyclic dibasic carboxylic acid radical that is linked to the RHg group through the replacement of the hydrogen atom of the carboxyl groups.

8. A new organic compound of the general formula $(RHg)_2R_1$, in which R represents an aromatic structure to a carbon atom of which the mercury is directly attached, and in which none of the carbon atoms has direct linkage with any other element other than hydrogen, carbon and mercury; and in which $R_1$ represents a polynuclear heterocyclic dibasic carboxylic acid radical that is linked to the RHg group through the replacement of the hydrogen atom of the carboxyl groups.

9. A new organic compound of the general formula $RHgR_1$, in which R represents an aromatic structure to a carbon atom of which the mercury is directly attached, and in which none of the carbon atoms has direct linkage with any element other than hydrogen, carbon and mercury; and in which $R_1$ represents a mononuclear heterocyclic monocarboxylic acid radical that is linked to the RHg group through the replacement of the carboxyl hydrogen atom.

10. A new organic compound of the general formula $RHgR_1$, in which R represents an aromatic structure to a carbon atom of which the mercury is directly attached, and in which none of the carbon atoms has direct linkage with any element other than hydrogen, carbon and mercury; and in which $R_1$ represents a polynuclear heterocyclic monocarboxylic acid radical that is linked to the RHg group through the replacement of the carboxyl hydrogen atom.

11. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $x$ is an integer having a value of at least one; and in which $R_1$ represents a pyridine carboxylic acid radical that is linked to the RHg group through the replacement of the hydrogen atom of the carboxyl group.

12. A new organic compound of the general formula $(RHg)_xR_1$, in which R represents an aromatic structure to a carbon atom of which the mercury is directly attached, and in which none of the carbon atoms has direct linkage with any element other than hydrogen, carbon and mercury; in which $x$ is an integer having a value of at least one; and in which $R_1$ represents a quinoline carboxylic acid radical that is linked to the RHg group through the replacement of the hydrogen atom of the carboxyl group.

13. A new organic compound of the general formula $(C_6H_5Hg)_xR_1$, in which $R_1$ represents a heterocyclic acid radical that is linked to the $C_6H_5Hg$ group through the replacement of the acidic hydrogen atom of the acidic group.

14. A new organic compound of the general formula $(C_6H_5Hg)_xR_1$, in which $R_1$ represents a mononuclear heterocyclic carboxylic acid radical that is linked to the $C_6H_5Hg$ group through the replacement of the hydrogen atom of the carboxyl group.

15. A new organic compound of the general formula $(C_6H_5Hg)_xR_1$, in which $R_1$ represents a polynuclear heterocyclic carboxylic acid radical that is linked to the $C_6H_5Hg$ group through the replacement of the hydrogen atom of the carboxyl group.

16. A new organic compound of the general formula $(C_6H_5Hg)_xR_1$, in which $R_1$ represents a pyridine carboxylic acid radical that is linked to the $C_6H_5Hg$ group through the replacement of the hydrogen atom of the carboxyl group.

17. A new organic compound of the general formula $(C_6H_5Hg)_xR_1$, in which $R_1$ represents a quinoline carboxylic acid radical that is linked to the $C_6H_5Hg$ group through the replacement of the hydrogen atom of the carboxyl group.

18. Phenylmercury fuorate.

19. Phenylmercury quinolinate.

20. Phenylmercury 2-phenyl quinoline 4-carboxylate.

CARL N. ANDERSEN.